W. A. PENDRY.
TRIPLE VALVE.
APPLICATION FILED APR. 12, 1909.

959,800.

Patented May 31, 1910.

2 SHEETS—SHEET 1.

Witnesses:
John Enders
Chas. H. Buell

Inventor:
William A. Pendry.
By Sheridan, Wilkinson & Scott,
Attys.

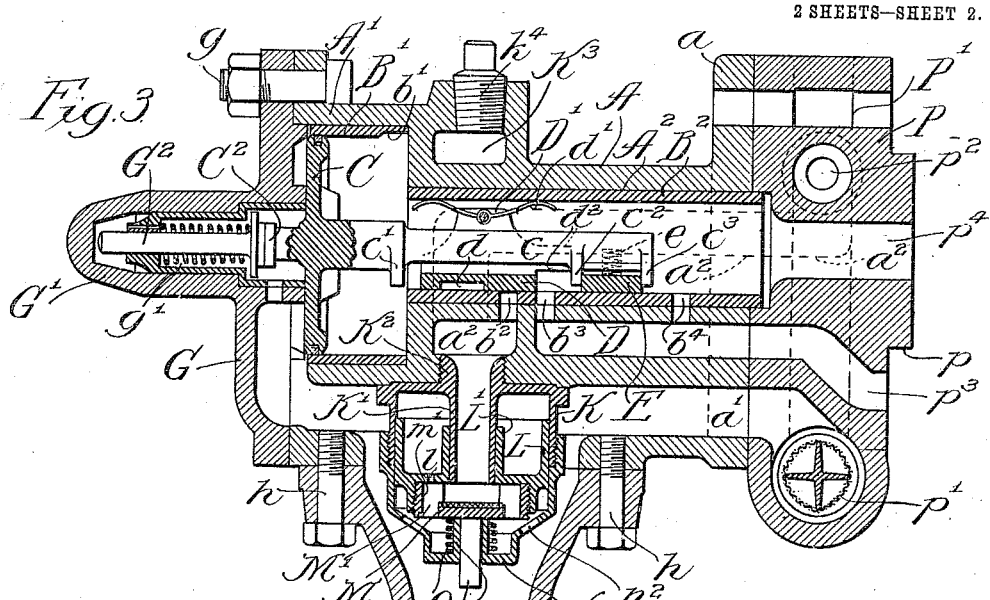
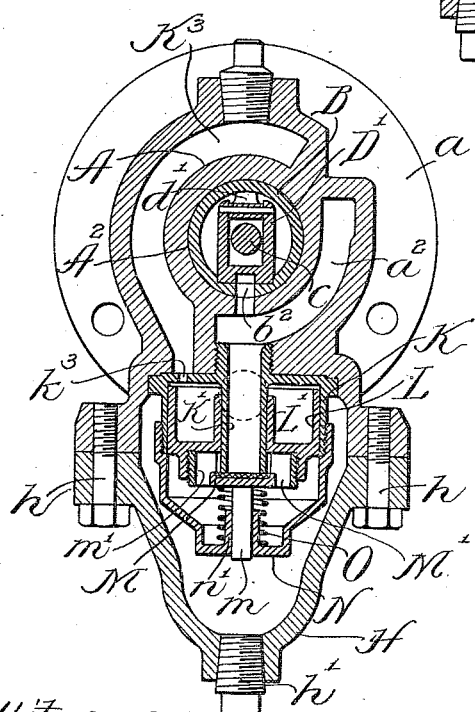
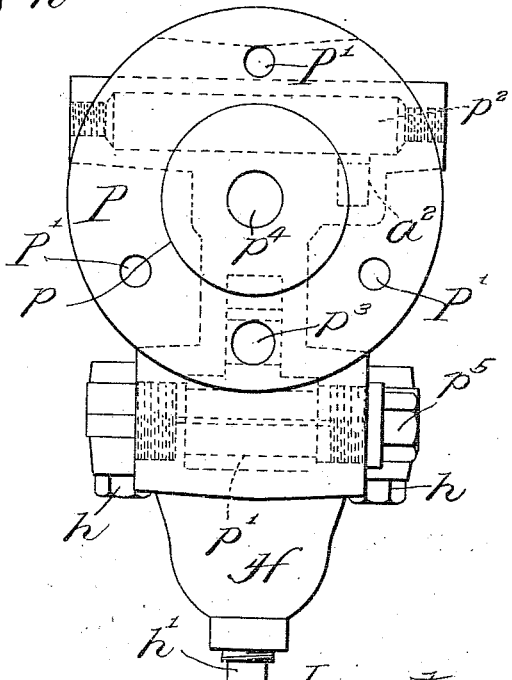

UNITED STATES PATENT OFFICE.

WILLIAM A. PENDRY, OF DETROIT, MICHIGAN.

TRIPLE VALVE.

959,800.

Specification of Letters Patent.

Patented May 31, 1910.

Application filed April 12, 1909. Serial No. 489,421.

*To all whom it may concern:*

Be it known that I, WILLIAM A. PENDRY, a citizen of the United States, residing at Detroit, in the county of Wayne and State of Michigan, have invented certain new and useful Improvements in Triple Valves, of which the following is a specification.

My invention relates in general to automatic air brakes, and more particularly to improvements in triple valves.

In the use of triple valves, it is often necessary to remove the valve mechanism from the inclosing casing in order to replace valve faces, valve seats, and worn out packings, and in order to remove foreign matter from ports and passages which has been deposited by the compressed air. In triple valves in general use, in order to remove the valve mechanism from the inclosing casing, it is necessary to disconnect the couplings with some of the coöperating parts of the brake apparatus, as the couplings are connected with parts of the casing which must be detached in order that the valve mechanism may be removed. This operation requires considerable time and labor, and consequently delays the use of the car upon which the brake apparatus needing attention is located.

One of the objects of my invention is to provide an improved quick acting triple valve, the entire valve mechanism of which may be removed from the casing without detaching the couplings leading to the other parts of the brake apparatus.

A further object of my invention is to provide an improved quick acting triple valve, in which the quick acting valve will operate instantly upon a predetermined lowering of the train pipe pressure independently of any movement of the triple valve proper.

A still further object of my invention is to provide an improved quick acting triple valve, which will be comparatively simple in construction, economical in manufacture, efficient in operation, and durable in use.

My invention will be more fully disclosed hereinafter by reference to the accompanying drawings, in which the same is illustrated as embodied in a convenient and practical form, and in which—

Figure 1:
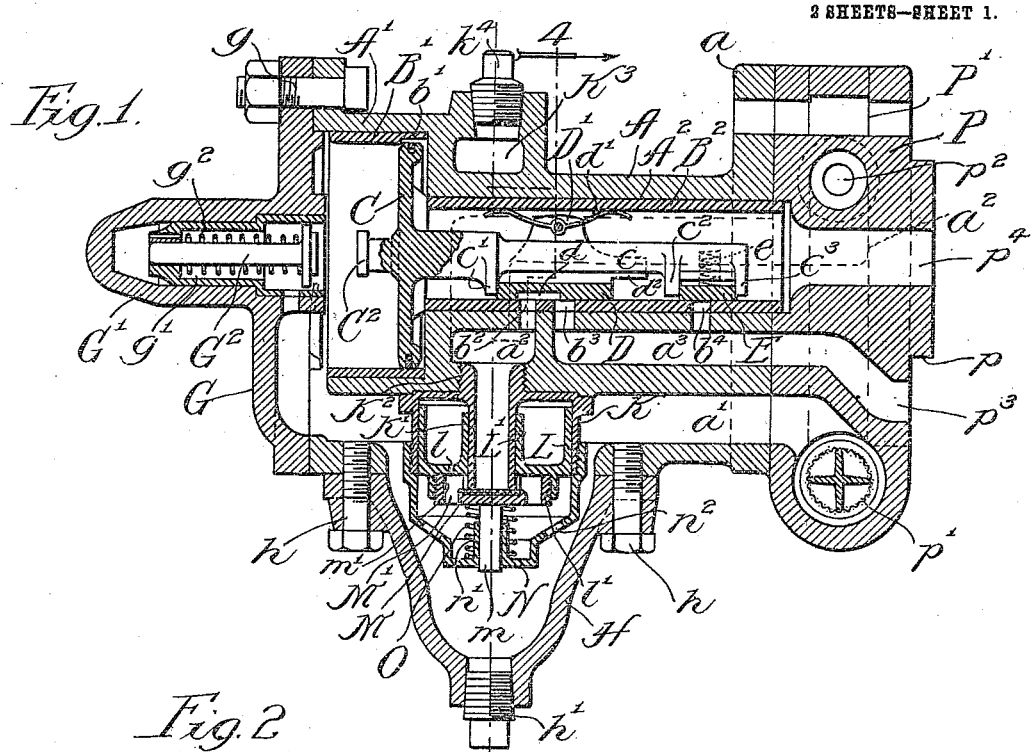
Figure 2:
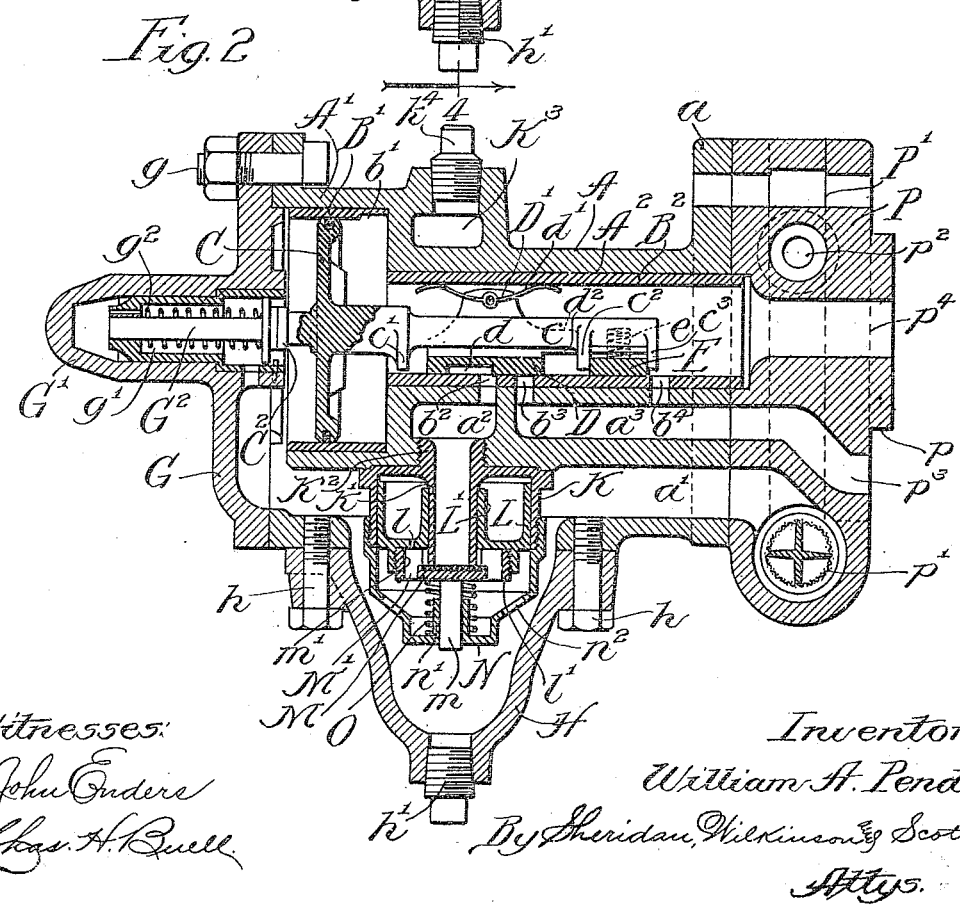

Figure 1 is a central vertical section showing the valve mechanism in "release" position; Fig. 2, a view similar to Fig. 1, showing the valve mechanism in "service" position; Fig. 3, a view similar to Figs. 1 and 2, showing the valve mechanism in "emergency" position; Fig. 4, a cross sectional view on the line 4, 4, Fig. 1; and Fig. 5, an end elevational view looking from the right in Figs. 1, 2 and 3.

The same reference characters are used to designate the same parts in the several figures of the drawings.

Reference letter A indicates the main section of the casing, and comprises a cylindrical piston chamber A' and a valve chamber $A^2$. A cylindrical bushing B' is located within the piston chamber A' and is provided with the usual feed groove b'.

$B^2$ indicates a bushing in the valve chamber $A^2$ which is provided with ports $b^2$, $b^3$ and $b^4$ extending through the valve seat therein. The port $b^2$ registers with an underlying port leading to an exhaust passage $a^2$, the latter extending upwardly partially around one side of the valve casing, as shown in Fig. 4, and thence longitudinally of the valve casing, as indicated by dotted lines in Fig. 1. The ports $b^3$ and $b^4$ register with underlying ports which communicate with a passage $a^3$ extending longitudinally of the valve casing and adapted to be placed in connection with the brake cylinder.

$a'$ indicates the train pipe passage in the valve casing which extends to and communicates with the piston chamber A'.

C indicates the triple valve piston fitting within the bushing B' and having a valve stem $c$ extending concentrically therefrom into the valve chamber.

D indicates the main slide valve which is provided with a passage $d$ in the under surface thereof. Parallel wings D' project upwardly from the sides of the main valve D and support between their upper ends a leaf spring $d'$ which engages the under surface of the top of the bushing $B^2$ and through its tension retains the valve D in contact with the underlying seat in the bushing. The valve D is located within lugs $c'$ and $c^2$ formed on the valve stem $c$, the distance between the lugs being slightly greater than the length of the valve so as to permit a small movement of the piston without moving the valve D.

E indicates the service graduating valve which controls the underlying port $b^4$ and is located between lugs $c^2$ and $c^3$ on the valve stem $c$. A spring $e$ is interposed between the valve stem and valve E to retain the latter in contact with the underlying valve seat.

G indicates the removable head of the piston cylinder A which is detachably secured in position by any suitable fastening devices, such, for instance, as bolts $g$ extending through alined holes in outwardly projecting flanges around the piston cylinder and cylinder head. The cylinder head is provided with a hollow outwardly projecting portion $G'$ in which is located a bushing $g'$. A plunger $G^2$ is mounted within the bushing $g'$ and is provided with a stem which extends through a guiding hole in the end of the bushing $g'$. A spring $g^2$ surrounds the stem of the plunger $G^2$ and is interposed between the head of the plunger and the opposite end of the bushing $g'$. The plunger $G^2$ is located in alinement with a stud $C^2$ projecting outwardly from the piston C.

H indicates a cap detachably secured to the under surface of the main section A of the valve casing, any suitable fastening devices being provided, as, for instance, screws $h$, extending through holes in the flange surrounding the cap and into engagement with screw threaded holes in the adjacent wall of the main section A of the casing. The bottom of the cap H is provided with a drainage opening closed by a removable plug $h'$. The quick acting valve mechanism is located within the cap H and comprises a cylinder K having an exteriorly screw threaded collar $K^2$ on the top thereof which engages an interiorly screw threaded hole leading to the exhaust passage $a^2$. A tube $K'$ depends within the cylinder K in alinement with the collar $K^2$. An opening $k^3$ is formed through the top wall of the cylinder K which communicates with a chamber $K^3$ formed in and extending partially around the main section A of the casing. The chamber $K^3$ serves as a reservoir for containing compressed air to operate the quick acting valve, and is provided with an opening closed by a removable plug $k^4$. Should the chamber $K^3$ be inadequate in capacity, an additional small reservoir may be placed in connection therewith by removing the plug $k^4$.

L indicates a cup-shaped piston located within the cylinder K and having a concentric sleeve $L'$ therein which surrounds the tube $K'$ in the cylinder K. The piston L is provided with an interiorly screw threaded circular flange $l$, on its under surface in which is supported a spider having an exteriorly screw threaded flange $m'$ and radial wings $M'$, the latter supporting a valve M which controls the opening through the lower end of the tube $K'$. The valve M is provided with a depending stem $m$ which extends through a guiding sleeve $n'$ carried by a suitable frame or spider N, the latter being provided with an interiorly screw threaded flange around its upper end which engages a screw thread upon the exterior of the cylinder K. A spring O surrounds the stem $m$ and is interposed between the valve M and the bottom of the frame N. The frame N is provided with holes $n^2$ extending therethrough, and a restricted hole $l$ is provided through the piston L. The train pipe passage $a'$ is enlarged so as to extend around the cylinder K and leave a space for the free passage of air around the cylinder to the piston cylinder $A'$.

P designates an end section of the valve casing which is adapted to be permanently secured to a supporting member of the brake apparatus, such, for instance, as the end of the brake cylinder or auxiliary reservoir. All of the connections between the valve casing and other parts of the brake apparatus are made through the end section P, so that such connections need not be disturbed when it is desired to remove the valve mechanism to be repaired or cleaned. The end section P of the valve casing is provided with a plurality of holes $P'$ extending therethrough with which register holes through the flange $a$ around the adjacent end of the main section A of the valve casing. Bolts are adapted to pass through the holes in the flange $a$ and registering holes $P'$ into engagement with the supporting member of the brake apparatus, so that by removing such bolts section A may be entirely detached while the section P remains upon the supporting member.

A transverse passage $p'$ extends through the lower portion of the section P with which communicates the passage $a'$ in the section A. One end of the passage $p'$ is adapted to be closed by a plug $p^5$, as shown at the right of Fig. 5, while the other end of such passage is adapted to have secured thereto a branch of the train pipe. A transverse passageway $p^2$ extends through the upper portion of the section P with which communicates the exhaust passageway $a^2$, one end of such transverse passage $p^2$ being adapted to be closed by a plug, and the other end adapted to communicate with an exhaust conduit leading to any desired point. A central passage $p^4$ extends through the section P in alinement with the valve chamber and is adapted to communicate with the auxiliary reservoir. A passage $p^3$ also extends through the section P and registers with the passage $a^3$, the opposite end of such passage $p^3$ being adapted to be placed in communication with the brake cylinder.

In order to more efficiently position the section P upon the end of the brake cylinder or auxiliary reservoir, a circular projection $p$ is provided which is adapted to be received within a similar opening or depression in the brake cylinder or auxiliary reservoir.

The operation of my improved triple valve is as follows:

*Release or running position.*—Fig. 1 illustrates the parts of the valve mechanism in release or running position, in which the brake cylinder communicates through the passages $p^3$, $p^5$, port $b^3$, passage $d$ in the main valve D, port $b^2$, passage $a^2$, and passage $p^2$ with the exhaust. Train pipe pressure passes through the passage $p'$, passage $a'$, feed groove $b^7$ in the bushing B', valve chamber, and passage $p^4$ to the auxiliary reservoir. It will be observed that the reservoir is disconnected from the ports $b^2$, $b^3$ and $b^4$ by the main valve D and graduating valve E. The train pipe pressure also passes through the holes $n^2$ in the spider N, through the restricted hole $l$ in the piston L, through the hole $l^3$ in the top of the cylinder K into the reservoir chamber $K^3$. As the surface of the valve M is exposed to the exhaust through the tube K', it is obvious that the valve M is loaded so as to be maintained in closed contact with the lower end of the tube K'.

*Service application.*—In order to effect a service application of the brakes, the train pipe pressure is reduced to the usual extent, whereupon the excess pressure of the auxiliary reservoir pressure forces the piston C toward the left until the stud $C^2$ thereon engages the plunger $G^2$, as shown in Fig. 2. This movement of the piston moves the main valve D through the contact of the lug $c^2$ on the piston rod with the lugs $d^2$ on the valve wings D', until the port $b^3$ is closed and the connection between the brake cylinder and exhaust thereby closed. This movement of the piston also uncovers the port $b^4$ so that the auxiliary reservoir pressure passes therethrough to the brake cylinder. When the supply of air to the brake cylinder lowers the auxiliary reservoir pressure slightly below that of the reduced train pipe pressure, the piston C moves slightly toward the right from the position shown in Fig. 2 until the lug $c'$ engages the adjacent end of the main valve D, such movement of the piston serving to move the service valve E over the port $b^4$, thereby discontinuing the supply of auxiliary reservoir pressure to the brake cylinder.

*Emergency application.*—When an excessive reduction of train pipe pressure occurs, the excess pressure of the auxiliary reservoir forces the piston C to its extreme left-hand position, as shown in Fig. 3, the differences in pressures on the opposite sides of the piston being sufficient to prevent the plunger $G^2$ from limiting the movement of the piston. This extreme movement of the piston not only moves the valve E from above the port $b^4$, but also moves the main valve D sufficiently to uncover the port $b^3$, so that the auxiliary reservoir pressure passes to the brake cylinder through both the ports $b^3$ and $b^4$.

Coincidentally with the above described movement of the triple valve mechanism proper, the quick acting piston L is depressed by the excess of pressure in the reservoir $K^3$ over the train pipe pressure, so that the valve M uncovers the lower end of the tube K', thereby permitting train pipe pressure to pass to the exhaust passage $a^2$.

In order to release the brakes after either service or emergency application, the train pipe pressure is increased, thereby forcing the piston G toward the right until it occupies the position shown in Fig. 1, in which the brake cylinder is connected with the exhaust and the train pipe with the auxiliary reservoir. The spring O serves to immediately close the quick action valve N upon a substantial equalization of pressure on the opposite sides of the piston L.

From the foregoing description, it will be observed that I have invented an improved quick action triple valve, all of the moving parts of which, together with the coöperating stationary parts, may be removed by disconnecting the main portion A of the casing from the supporting section P, allowing the section P to remain fixed upon the supporting member of the brake apparatus, and thereby obviating the necessity of disconnecting any of the connections between the triple valve casing and coöperating parts of the brake apparatus, inasmuch as all of such connections extend from the stationary section P. It will be further observed that I have invented a very simple and efficient quick acting triple valve, and one in which the quick acting valve mechanism operates in emergency applications coincidentally with the operation of the main triple valve, without the necessity of the main triple valve first moving before the quick acting valve can operate.

While I have illustrated and described my invention with more or less detail, yet it is to be understood that I do not consider that my invention is restricted to any specific embodiment, but may be expressed in any physical forms coming within the terms of my claims.

I claim:

1. In a quick acting triple valve casing, the combination with a main section having a valve chamber therein communicating with train pipe, auxiliary reservoir, exhaust, and brake cylinder, passages extending longitudinally through and terminating in the end surface of said section, of a cap for inclosing the quick acting valve mechanism detachably secured to said main section and forming an extension of the train pipe passage intermediate of its ends.

2. A quick acting triple valve casing having piston and valve chambers therein, and also having formed therein at one side of and above the valve chamber a quick action reservoir chamber.

3. In a quick acting triple valve casing, the combination with a main section having piston and valve chambers therein communicating with train pipe, auxiliary reservoir and brake cylinder, passages extending longitudinally through and terminating in the end surface of said section, said section also having formed therein a quick action reservoir chamber, of a cap for inclosing the quick acting valve mechanism detachably secured to said main section intermediate of the ends and forming an extension of the train pipe passage.

4. In a quick action triple valve casing, the combination with an end section adapted to be permanently secured to a supporting member of the brake apparatus and having passages communicating with the train pipe, auxiliary reservoir and brake cylinder, of a main section detachably supported upon said end section and having train pipe, auxiliary reservoir and brake cylinder passages communicating with the corresponding passages in said end section, and a cap for inclosing the quick acting valve mechanism detachably secured to said main section intermediate of the ends and forming an extension of the train pipe passage.

5. In a quick acting triple valve, the combination with a casing having therein piston and valve chambers and passages communicating with the train pipe, brake cylinder and exhaust, of a piston and slide valve actuated thereby located in said chambers for controlling the supply and exhaust of pressure to and from the brake cylinder, and quick acting valve mechanism for connecting and disconnecting the train pipe and said exhaust passage.

6. In a quick acting triple valve, the combination with a casing having therein piston and valve chambers and longitudinal passages communicating with the train pipe, brake cylinder and exhaust and terminating in the end surface of the casing, of a piston and valve actuated thereby located in said chambers for controlling the supply and exhaust of pressure to and from the brake cylinder, a cap detachably secured to said casing intermediate of the ends and forming an extension of the train pipe passage, and quick acting valve mechanism inclosed by said cap and located in an enlarged portion of the train pipe passage for exhausting the train pipe pressure in emergency applications of the brakes.

7. The combination with a triple valve, of a quick acting valve mechanism comprising a cylinder having a concentric tube therein communicating with an exhaust passage, a piston in said cylinder exposed on one side to train pipe pressure and having a concentric sleeve surrounding said tube, and a valve carried by said piston for closing the end of said tube, said piston having a restricted hole therethrough for equalizing the pressure on opposite sides thereof.

8. The combination with a triple valve, of a quick acting valve mechanism comprising a cylinder having a closed end through which concentrically extends a tube communicating with an exhaust passage, a piston in said cylinder exposed on its outer surface to train pipe pressure and having a concentric sleeve surrounding said tube, a valve carried by said piston for closing the end of said tube, said piston having a restricted hole therethrough for equalizing the pressure on opposite sides thereof, and a reservoir communicating with said cylinder through an opening in the closed end thereof.

9. In a quick acting triple valve, the combination with a casing having piston and valve chambers therein communicating with the train pipe, auxiliary reservoir, brake cylinder and exhaust passages, of a piston and valve actuated thereby located in said chambers, a cylinder located in said train pipe passage and having a concentric tube therein communicating with said exhaust passage, a piston in said cylinder concentrically surrounding said tube, a valve carried by said piston for controlling the lower end of said tube, and a reservoir chamber formed in said casing communicating with said cylinder at one side of said piston, said piston being exposed on its other sides to train pipe pressure.

10. In a quick acting triple valve, the combination with a casing comprising valve and piston chambers having train pipe, brake cylinder and exhaust ports, of a piston and valve actuated thereby located in said chambers, said casing having a passageway extending transversely from said exhaust port partially around the valve chamber and thence longitudinally to the end surface of the casing, quick acting valve mechanism, and a reservoir for actuating the quick acting valve mechanism formed in said casing and extending around the opposite side thereof from the transverse portion of the exhaust passageway.

In testimony whereof, I have subscribed my name.

WILLIAM A. PENDRY.

Witnesses:
ANNIE C. COURTENAY,
GEO. L. WILKINSON.